United States Patent
Zimmerman (10) Patent No.: US 9,819,053 B1
(45) Date of Patent: Nov. 14, 2017

(54) SOLID ELECTROLYTE HIGH ENERGY BATTERY

(71) Applicant: Michael A. Zimmerman, North Andover, MA (US)

(72) Inventor: Michael A. Zimmerman, North Andover, MA (US)

(73) Assignee: Ionic Materials, Inc., Woburn, MA (US)

(*) Notice: Subject to any disclaimer, the term of this patent is extended or adjusted under 35 U.S.C. 154(b) by 84 days.

(21) Appl. No.: 13/861,170

(22) Filed: Apr. 11, 2013

Related U.S. Application Data (60) Provisional application No. 61/622,705, filed on Apr. 11, 2012.

(51) Int. Cl.

| | |
|---|---|
| *C08L 81/02* | (2006.01) |
| *C08K 3/22* | (2006.01) |
| *C08K 5/08* | (2006.01) |
| *H01M 10/0565* | (2010.01) |
| *B29C 47/00* | (2006.01) |
| *H01M 10/04* | (2006.01) |

(Continued)

(52) U.S. Cl.
CPC ..... *H01M 10/0565* (2013.01); *B29C 47/0004* (2013.01); *H01M 10/04* (2013.01); *H01M 10/0525* (2013.01)

(58) Field of Classification Search
CPC .......................... H01M 10/0565; H01M 6/181
See application file for complete search history.

(56) References Cited

U.S. PATENT DOCUMENTS

| | | | | |
|---|---|---|---|---|
| 3,502,606 | A * | 3/1970 | Smart ............... | C08L 79/04 524/173 |
| 4,804,594 | A * | 2/1989 | Jow et al. ................ | 429/213 |

(Continued)

FOREIGN PATENT DOCUMENTS

| WO | WO 9842037 A1 * | 9/1998 |
|---|---|---|

OTHER PUBLICATIONS

Ellis, Bryan Smith, Ray. (2009). Polymers—A Property Database (2nd Edition)—Poly(phenylene sulfide). Taylor & Francis. Online version available at: http://app.knovel.com/hotlink/pdf/id:kt00CAO7P5/polymers-property-database/poly-phenylene-sulfide.*

(Continued)

*Primary Examiner* — Stephen Rieth
(74) *Attorney, Agent, or Firm* — Preti Flaherty Beliveau & Pachios LLP

(57) ABSTRACT

The present invention is directed to a battery including a solid ionically conductive polymer electrolyte having a first surface and a second surface; a first electrode disposed on the first surface of the solid ionically conductive polymer electrolyte; a second electrode disposed on the second surface of the solid ionically conductive polymer electrolyte; and at least a first conductive terminal and a second conductive terminal, each terminal being in electrical contact with respectively the first conductive electrode and the second conductive electrode. The invention is also directed to a material including a polymer; a dopant; and at least one compound including an ion source; wherein a liberation of a plurality of ions from the ion source provides a conduction mechanism to form an ionically conductive polymer material. The present invention is further directed to methods for making such batteries and materials.

2 Claims, 14 Drawing Sheets

(51) Int. Cl.
*H01M 10/0525* (2010.01)
*H01M 6/18* (2006.01)

(56) References Cited

U.S. PATENT DOCUMENTS

| | | | | |
|---|---|---|---|---|
| 5,270,137 | A * | 12/1993 | Kubota | 429/249 |
| 5,403,675 | A * | 4/1995 | Ogata | C07C 45/46 |
| | | | | 429/314 |
| 5,688,613 | A * | 11/1997 | Li et al. | 429/310 |
| 6,274,681 | B1 * | 8/2001 | Inagaki et al. | 525/344 |
| 2008/0300380 | A1 * | 12/2008 | Bai | C08G 61/123 |
| | | | | 528/289 |

OTHER PUBLICATIONS

Polystyrene Information. Cidra Precision Services, LLC. http://www.cidraprecisionservices.com/life-sciences-materials-polymer-materials-polystyrene.html. As viewed on May 26, 2015.*

Teng, H. Overview of the development of the fluoropolymer industry. Applied Sciences, 2012, vol. 2, pp. 496-512.*

Definition of Dopant. http://www.merriam-webster.com/dictionary/dopant. As viewed on Oct. 8, 2015.*

Sandor, R. B. PBI (polybenzimidazole): Synthesis, properties, and applications. High Performance Polymers, 1990, vol. 2, pp. 25-37.*

Wikipedia entry of Electrolyte. https://en.wikipedia.org/wiki/Electrolyte. As viewed on Nov. 10, 2015.*

Lefrou, C.; Fabry, P.; Poignet, J-C. Electrochemistry: The Basics, With Examples. 2012. Springer-Verlag Berlin Heidelberg. pp. 22-25.*

Miyatake, K.; Iyotani, H.; Yamamoto, K.; Tsuchida, E. Synthesis of poly(phenylene sulfide sulfonic acid) via poly(sulfonium cation) as a thermostable proton-conducting polymer. Macromolecules, 1996, vol. 29, pp. 6969-6971.*

Polyphenylene Sulfide Information. DIC Corporation. http://www.dic-global.com/us/en/products/pps/about.html. As viewed on Jun. 8, 2016.*

Candlin J. Polymers. within The Chemical Industry: Second Edition. Edited by Alan Heaton. 1994. Springer Science+Business Media Dordrecht. pp. 116-121.*

Sannigrahi, A.; Arunbabu, D.; Sankar, R. M.; Jana, T. Tuning the molecular properties of polybenzimidazole by copolymerization. J. Phys. Chem. B. 2007, vol. 111, pp. 12124-12132.*

Definition of nonflammable. http://www.dictionary.com/browse/nonflammable?s=t. As viewed on Jun. 7, 2016.*

"Ionic Conductivity of Conjugated Water-Soluble Rigid-Rod Polymers"; J. Polymer, Sci., Part B Polym Phys. 1993, 31, 1941.

"Anisotropic Ionic Conductivity of Lithium-Doped Sulfonated PBI", J. Polym. Sci. Part B. Polym. Phys. 1997, 35, 2925.

* cited by examiner

Film Thickness as low as 0.0003" have been achieved

Extrusion Process

- Lithium anode
- Polymer electrolyte
- Cathode
- Current Collector

FIG. 5

- Current Collector
- Anode Material/Mixed with Ionic Polymer Electrolyte
- Ionic Polymer Electrolyte Film
- Cathode Material/Mixed with Ionic Polymer Electrolyte
- Current Collector Schematic of solid polymer battery with PEO

Conductivity of traditional polymers by ionic diffusion follows a Voegel-Tamman-Fulcher (VTF) relationship:

$\sigma = AT^{-1/2} \exp[-E_a/k_B(T-T_o)]$

Ionic Conductivity vs. temperature of traditional amorphous PEO polymer

FIG. 8
PRIOR ART

They can fold, and they can stack. A stack of polymer chains folded back on themselves like this is called a lamella.

Amorphous and Crystalline Polymers

FIG. 9

$ClC_6H_4Cl + Na_2S \rightarrow 1/n\ [C_6H_4S]_n + 2\ NaCl$

| Compounds | A | B | C | D |
|---|---|---|---|---|
| Base Resin | | | | |
| Phillips-Chevron Ryton QC160N PPS | 80 wt% | 50 wt% | 67 wt% | 50 wt% |
| | | | | |
| Ion Source Fillers | | | | |
| Zinc Oxide, 20nm spheres | 20 wt% | 50 wt% | | |
| Lithium Oxide, milled to <2 micron | | | 33 wt% | 50 wt% |

FIG. 12

Table 1
Exemplary formulations investigated.

FIG. 13

2,3-dicyano-5,6-dichlorodicyanoquinone

Cyclic Voltammetry of Ionically Conductive Polymer versus Lithium Metal

FIG. 18

Ionically conductive electrolyte and electrode components

FIG. 19

Solid State Battery-Electrode and electrolyte bonded together

FIG. 20

Flexible form of battery

*FIG. 21*

SOLID ELECTROLYTE HIGH ENERGY BATTERY

STATEMENT REGARDING FEDERALLY SPONSORED RESEARCH OR DEVELOPMENT (Not applicable)

BACKGROUND OF THE INVENTION

Lithium ion (and other) batteries generally employ a liquid electrolyte which is hazardous to humans and to the environment and which can be subject to fire or explosion. Liquid electrolyte batteries are hermetically sealed in a steel or other strong packaging material which adds to the weight and bulk of the packaged battery. A new innovation is the pouch cell, which has been used in lightweight batteries, but these have not seen widespread acceptance.

Conventional liquid electrolyte also suffers from the build-up of a solid interface layer at the electrode/electrolyte interface which causes eventual failure of the battery. Conventional lithium ion batteries can also exhibit slow charge times on the order of hours. In addition, the batteries suffer from a limited number of recharges since the chemical reaction within the battery reaches completion and limits the re-chargeability because of corrosion and dendrite formation. The liquid electrolyte also limits the maximum energy density. The electrolyte starts to break down at about 4.2 volts. New industry requirements for battery power are often 4.8 volts and higher which cannot be achieved by present liquid electrolyte lithium ion cells. There have been developments in both spinel structures and layered oxide structures which have not been deployed due to the limitations of the liquid electrolyte. Also, lithium ion batteries with liquid electrolytes suffer from safety problems with respect to flammability of the liquid electrolyte.

Figure 1:
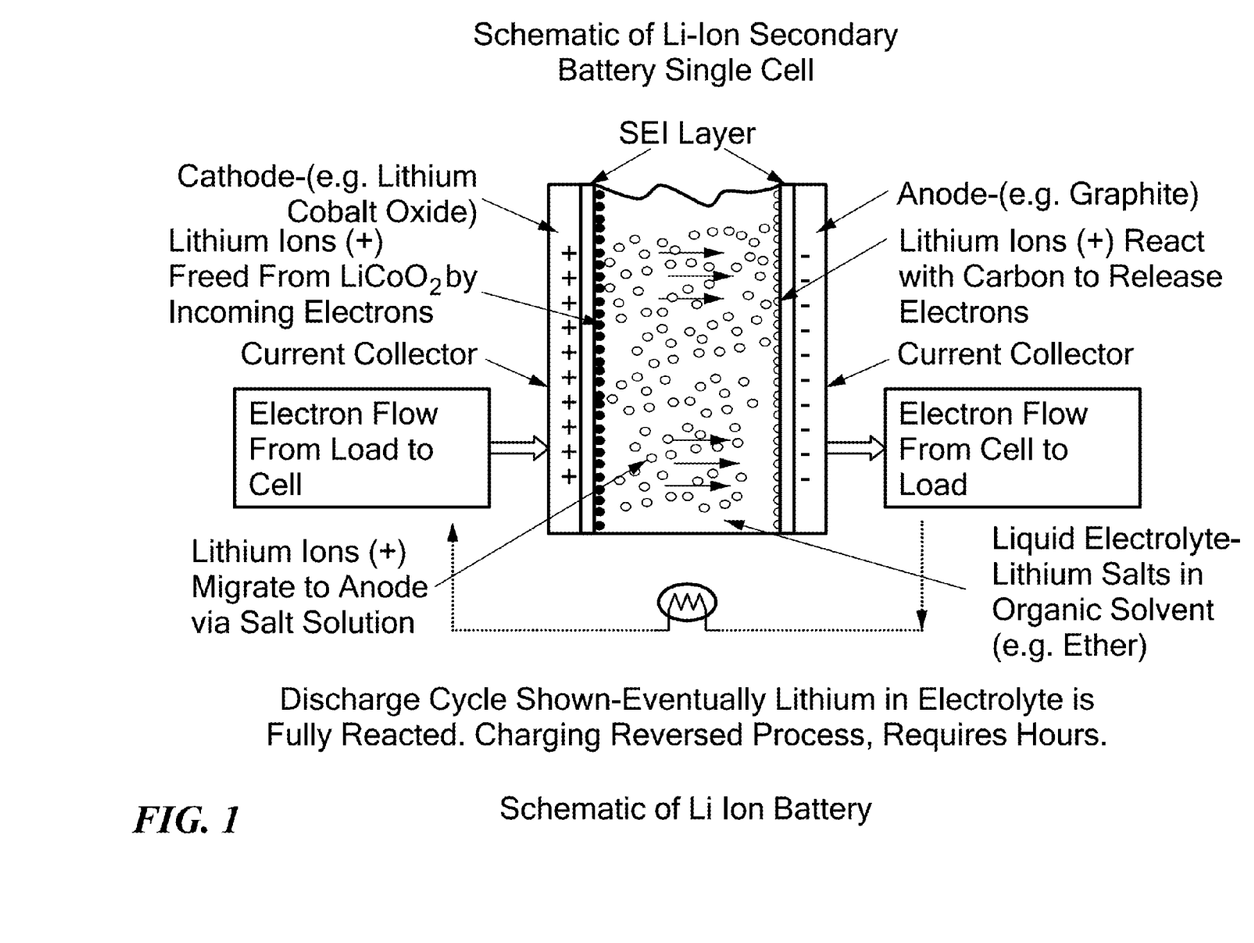
FIG. 1 shows show a schematic of a conventional lithium ion battery according to the prior art.
Figure 2:
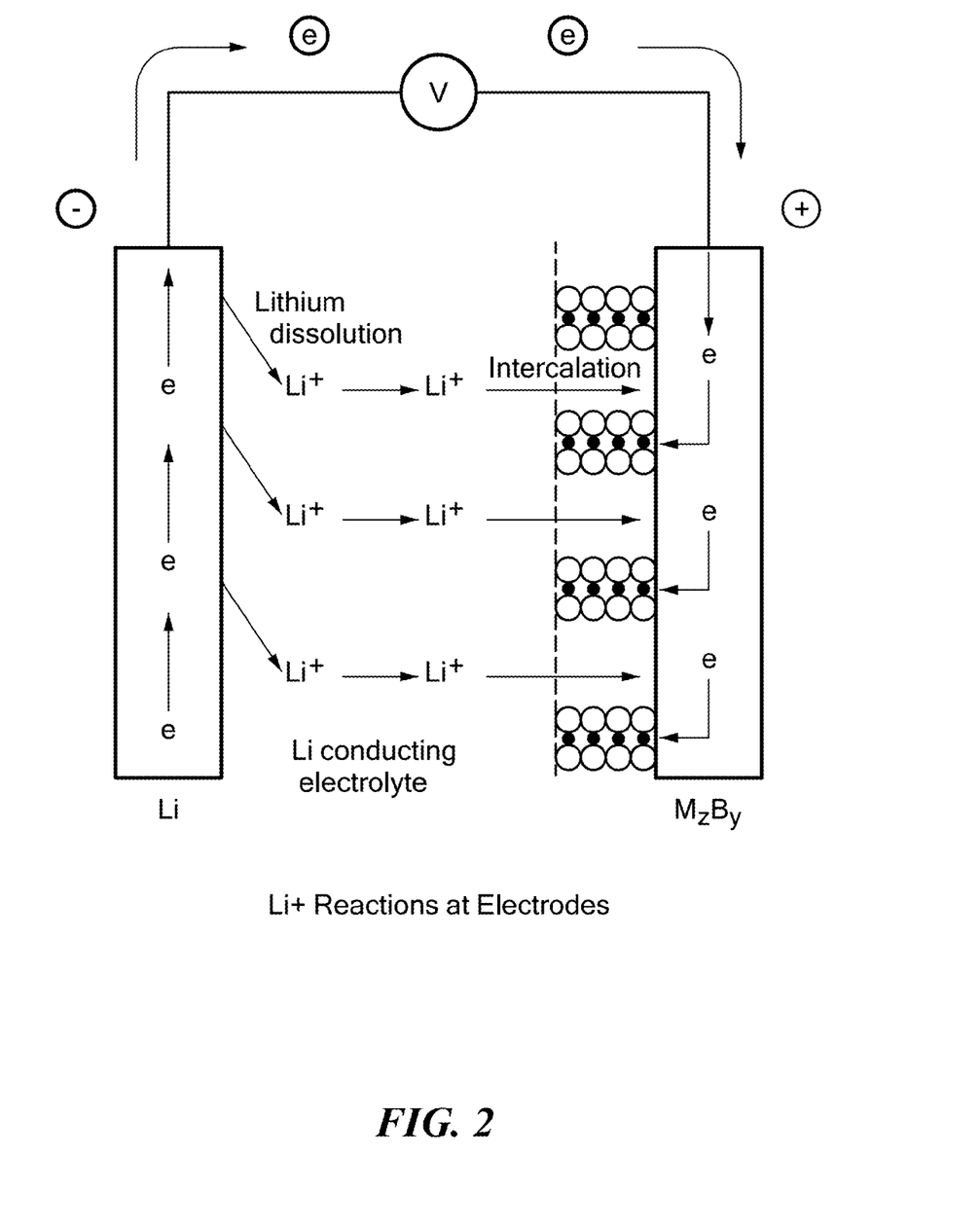
FIG. 2 shows reactions at electrodes in a conventional lithium ion battery according to the prior art.

In a conventional lithium ion battery having a liquid electrolyte there is also a need for a separator in the liquid electrolyte. The separator is a porous structure which allows for ions to flow through it, and blocks electrons from passing through it. The liquid electrolyte battery usually requires a vent to relieve pressure in the housing, and in addition, such conventional batteries usually include safety circuitry to minimize potentially dangerous over-currents and over-temperatures. FIGS. 1 and 2 show schematics and general reactions in such conventional lithium ion batteries.

BRIEF SUMMARY OF THE INVENTION

In accordance with the invention, a lithium ion battery is provided which has a solid polymer electrolyte. The solid electrolyte enables a lighter weight and much safer architecture by eliminating the need for heavy and bulky metal hermetic packaging and protection circuitry. The novel solid polymer battery can be of smaller size, lighter weight and higher energy density than liquid electrolyte batteries of the same capacity. The solid polymer battery also benefits from less complex manufacturing processes, lower cost and reduced safety hazard, as the electrolyte material is non-flammable. The novel battery will also provide cell voltages greater than 4.2 volts. The solid electrolyte can be formed into various shapes by extrusion (and co-extrusion), molding and other techniques such that different form factors can be provided for the battery. Particular shapes can be made to fit into differently shaped enclosures in devices or equipment being powered. In addition, the novel battery does not require a separator, as with liquid electrolyte batteries, between the electrolyte and electrodes, nor does the novel battery require a vent. The weight of the novel battery is substantially less than a battery of conventional construction having similar power capacity. In some embodiments, the weight of the novel battery can be less than half the weight of a conventional battery.

The electrolyte material is a solid ionically conductive polymer which has preferably a semi-crystalline or crystalline structure which provides a high density of sites for ionic transport. The polymer structure can be folded back on itself. This will allow for new battery formats.

According to one aspect of the invention, the electrolyte is in the form of an ionic polymer film. An electrode material is directly applied to each surface of the electrolyte and a foil charge collector or terminal is applied over each electrode surface. A light weight protective polymer covering can be applied over the terminals to complete the film based structure. This thin film battery is flexible and can be rolled or folded into intended shapes to suit installation requirements.

According to another aspect of the invention, the electrolyte is in the form of an ionic polymer monofilament (hollow). Electrode materials and charge collectors are directly applied (co-extruded) to each surface of the electrolyte and a terminal is applied at each electrode surface. A light weight protective polymer covering can be applied over the terminals to complete the structure. This form of battery is thin, flexible, and can be coiled into intended shapes to suit installation requirements, including very small applications.

According to another aspect of the invention, a solid electrolyte can be molded in a desired shape. Anode and cathode electrode materials are disposed on respective opposite surfaces of the electrolyte to form a cell unit. Electrical terminals are provided on the anode and cathode electrodes of each cell unit for interconnection with other cell units to provide a multi cell battery or for connection to a utilization device.

In yet other aspects of the invention, methods for making such batteries are disclosed.

In all of the above aspects of the invention, the electrode materials (cathode and anode) can be combined with a form of the novel electrolyte material to further facilitate ionic movement between the two electrodes. This is analogous to a conventional liquid electrolyte soaked into each electrode material in a conventional lithium-ion battery.

BRIEF DESCRIPTION OF THE SEVERAL VIEWS OF THE DRAWINGS

The foregoing summary, as well as the following description of the invention, is better understood when read in conjunction with the appended drawings. For the purpose of illustrating the invention, exemplary constructions are shown in the drawings. The invention is not limited, however, to the specific methods and instrumentalities disclosed herein.

DETAILED DESCRIPTION OF THE INVENTION

The inventor has developed a non-flammable solid polymer electrolyte which is conductive at room temperature and can be used in any battery application. The material's novel conductivity mechanism improves energy density by 10-fold and reduces battery costs by up to 50%.

Existing solid state polymers used for ionic conductivity are based on alkali metals blended with polyethylene oxide (PEO). The three primary limitations with PEO are its temperature limitations, safety issues in commercial applications, and its manufacturability.

The Limited Temperature Range of PEO.

PEO according to the prior art is conductive only above the material's glass transition temperature (typically>50° C.); below that temperature it is in a glassy state and lacks conductivity. Above that temperature PEO exists in a viscoelastic state through which ions can conduct via chain mobility. Accordingly, the current blends of PEO with other materials used in laboratory and commercial applications all require high temperatures (>50° C.) to achieve the state necessary for the polymer to be reactive. This high temperature limits the kinds of applications PEO can be used in, even with necessary safety precautions for thermal runaway.

The Flammability of PEO.

PEOs according to the prior art are flammable, due to their volatile nature and high operating temperature. Currently, a battery utilizing PEO as an electrolyte requires a hermetic package around it to prevent thermal runaway. This adds an expensive thermal management system, adds safety risk to the end user, which can prevent end user adoption, and creates a rigid, bulky structure which the battery management system has to be designed around.

Manufacturability of PEO Batteries.

Commercial PEO manufacturers currently spray the polymer onto the electrodes during manufacturing. This batch-scale process is inefficient, and creates an end product that is stiff, thick, and costly to integrate into an end application. Moreover, although PEO has been in existence for over 20 years, it is still not commercially produced.

Liquid electrolytes embody many of the same problems as PEO as used in the prior art: high cost, safety concerns, cost and manufacturability challenges, poor mechanical properties and often a cause of performance degradation. The solid polymer approach of the present invention solves the problems associated with liquid electrolytes and addresses the limitations of PEO material.

The invention offers three key advantages in its polymer performance characteristics: (1) It has an expansive temperature range. In lab-scale testing, the crystalline polymer design has shown high ionic conductivity both at room temperature and over a wide temperature range. (2) It is non-flammable. The polymer self-extinguishes, passing the UL-V0 Flammability Test. The ability to operate at room temperature and the non-flammable characteristics demonstrate a transformative safety improvement that eliminates expensive thermal management systems. (3) It offers low-cost bulk manufacturing. Rather than spraying the polymer onto electrodes, the polymer material can be extruded into a thin film via a roll-to-roll process, an industry standard for plastics manufacturers. After the film is extruded, it can be coated with the electrode and charge collector materials to build a battery "from the inside out." This enables thin, flexible form factors without the need for hermetic packaging, resulting in easy integration into vehicle and storage applications at low cost.

The solid polymer electrolyte of the present invention is based on a transformative material that creates a new ionic conduction mechanism that provides a higher density of sites for ionic transport and allows higher voltages to run through the electrolyte with no risk of thermal runaway or damage to ion transport sites from lithiation. This characteristic enables a durable electrolyte for higher voltage cathode and anode materials in thin-film applications, resulting in higher energy densities for batteries in vehicle and stationary storage applications. The ability to run high voltages through an electrolyte that is conductive, mechanically robust, chemical and moisture resistant, and nonflammable not only at room temperature, but over a wide range of temperatures, will allow integration of high performance electrodes without costly thermal and safety mechanisms employed by the industry today.

Batteries prepared using the polymer electrolyte of the present invention are characterized by a 10-fold energy density improvement over current commercially available electrolytes, as well as a performance range of −40° C. to 150° C. with minimal conductivity degradation. The polymer electrolyte can be extruded by a process that produces working polymers at a thickness of 6 microns, which enables these traits in a thin-film format under commercial manufacturing conditions at batch scale. The polymer electrolyte allows the development of new, high throughput, low-cost manufacturing lines for solid electrolyte production, and can be integrated into a variety of product lines, including lithium and zinc battery manufacture. In addition, the polymer electrolyte is not limited to use in batteries, but can be used in any device or composition that includes an electrolyte material. For example, the polymer electrolyte material can be used in chemical separation processes, such as for the separation of ions, in electrochromic devices, electrochemical sensors, and fuel cell membranes.

Figure 3:
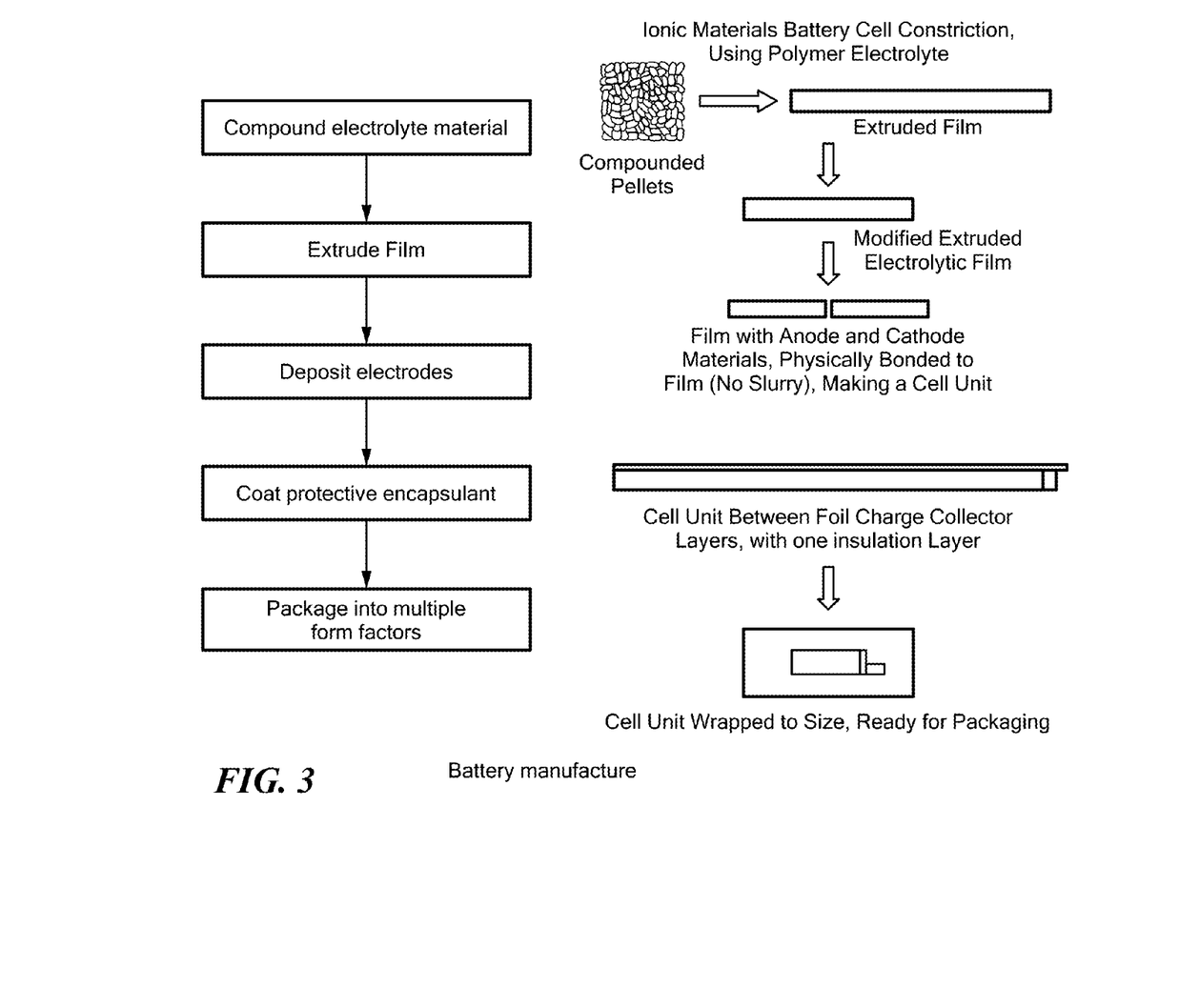
FIG. 3 exemplarily illustrates a method of the invention including steps for manufacturing a solid state battery using an extruded polymer.

FIG. 3 shows a method of manufacturing a solid state battery using an extruded polymer according to the invention. The material is compounded into pellets, and then extruded through a die to make films of variable thicknesses. The electrodes can be applied to the film using several techniques, such as sputtering or conventional casting in a slurry.

Figure 4:
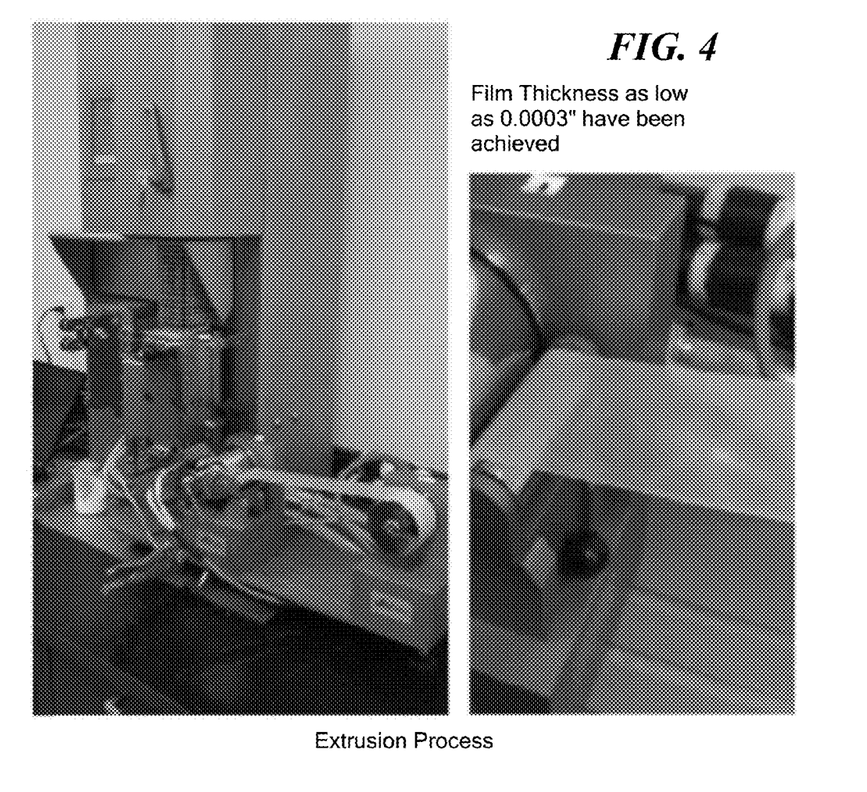
FIG. 4 exemplarily illustrates the extrusion process according to the invention.
Figure 5:
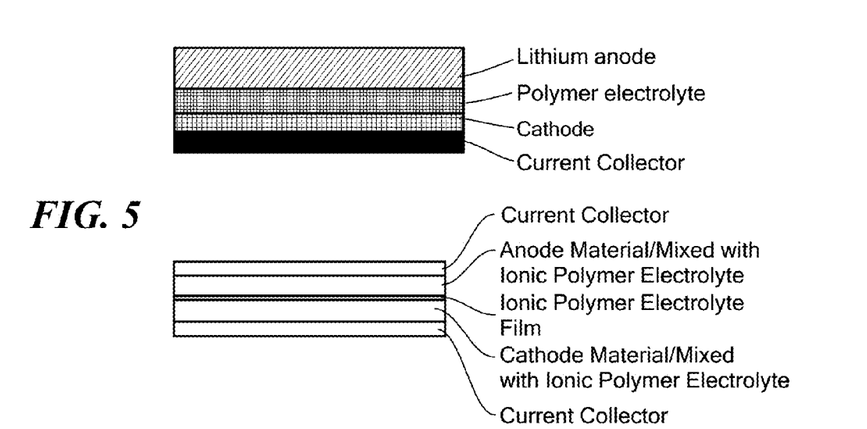
FIG. 5 exemplarily illustrates a schematic representation of an embodiment according to the invention.

FIG. 4 shows a method of manufacturing of an ionic polymer film according to the invention, which involves heating the film to a temperature around 295° C., and then casting the film onto a chill roll which freezes the plastic. The film can be very thin, in the range of 10 microns thick or less. FIG. 5 shows a schematic representation of the architecture of an embodiment according to the invention.

Figure 6:
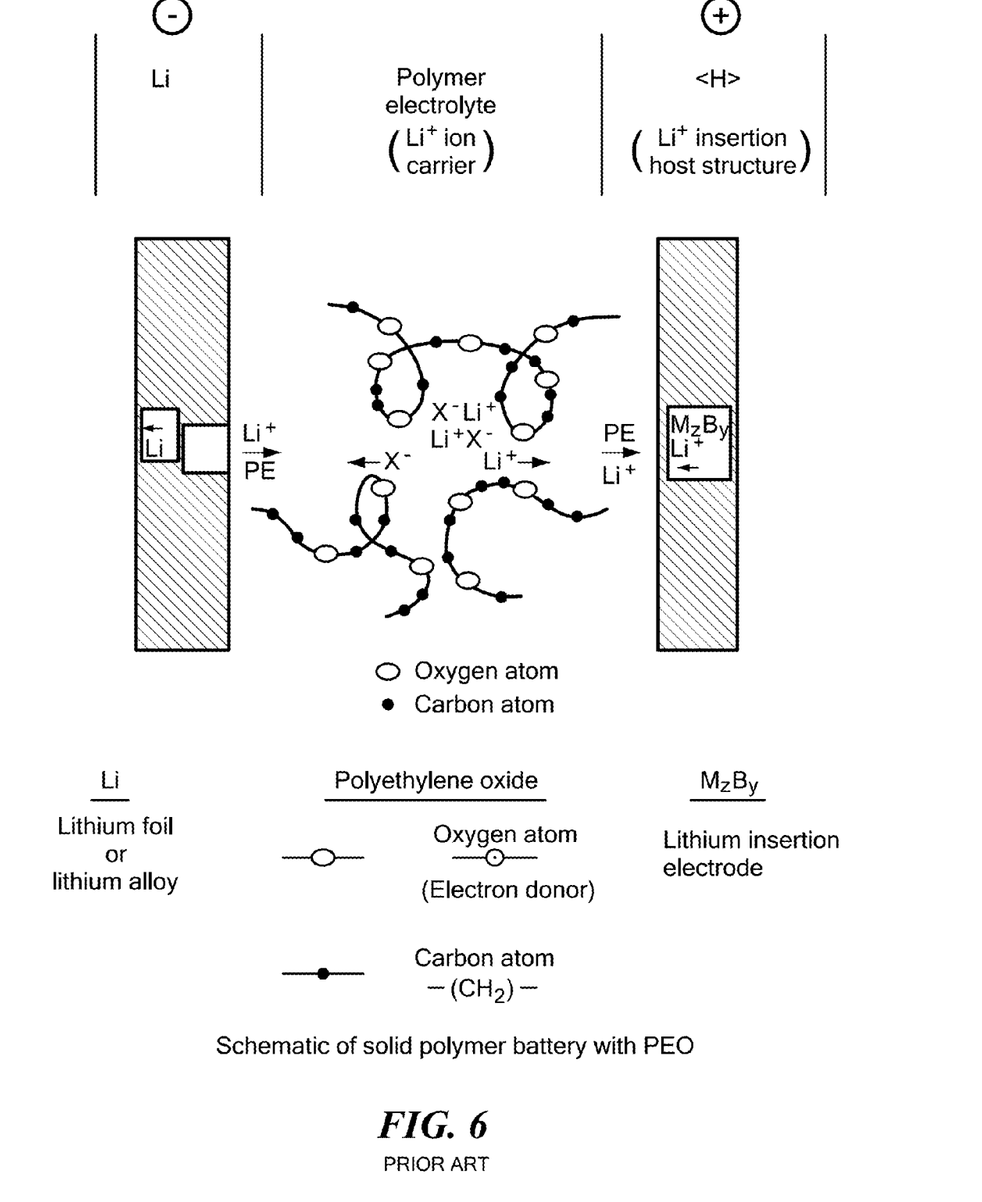
FIG. 6 shows a schematic of a solid polymer battery with polyethylene oxide according to the prior art.
Figure 7:
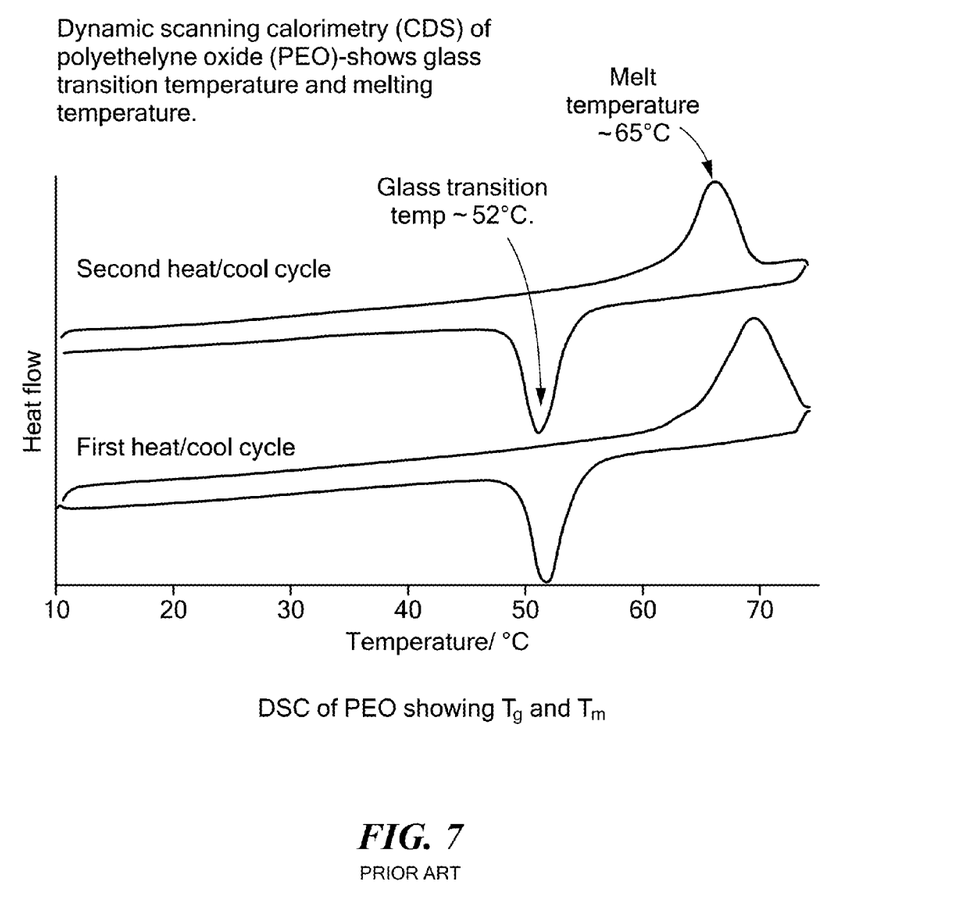
FIG. 7 shows a dynamic scanning calorimetry plot showing the glass transition temperature and melting temperature of polyethylene oxide according to prior art.

Previous attempts to fabricate polymer electrolytes were based on a specific ionically conductive material whose mechanism was discovered in 1973. The material is polyethylene oxide (PEO), and the ionic conduction mechanism is based on the "chain mobility" concept, which requires the polymer to be at a temperature higher than the glass transition temperature. FIG. 6 shows a schematic of a solid polymer battery with polyethylene oxide according to the prior art. Included in FIG. 7 is a dynamic scanning calorimetry (DSC) plot showing the glass transition temperature ($T_g$) and the melting temperature ($T_m$) of PEO.

Figure 8:
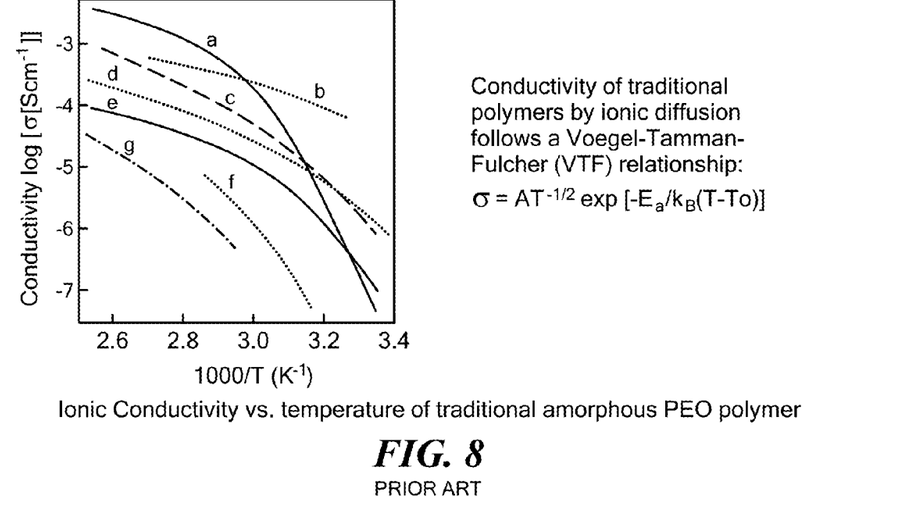
FIG. 8 shows the relationship of ionic conductivity versus temperature of traditional amorphous polyethylene oxide according to the prior art.

The mechanism for ion transport involves "motion" of the amorphous chains above the $T_g$. Above this temperature the polymer is very "soft" and its mechanical properties are very low. For application in lithium ion batteries, traditional lithium ion salts are used as additives such as $LiPF_6$, $LiBP_4$, or $LiCLO_4$. Lithium salts are a source of issues in conventional Li ion batteries such as corrosion, reliability, and high cost. FIG. 8 is a plot which shows the relationship of ionic conductivity versus temperature of traditional amorphous polymer (PEO) according to the prior art. FIG. 8 shows that traditional amorphous polymer (PEO) does not have meaningful conductivity at room temperature.

The solid polymer electrolyte according to the invention has the following characteristics: ionic conduction mechanism at room temperature, wide temperature range, ion "hopping" from a high density of atomic sites, and a new means of supplying ions (lithium or otherwise)

Figure 9:
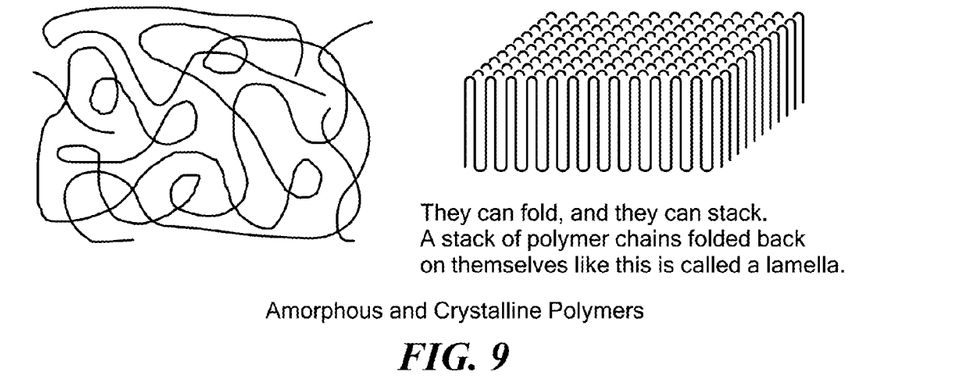
FIG. 9 shows a schematic illustration of amorphous and crystalline polymers.
Figure 10:
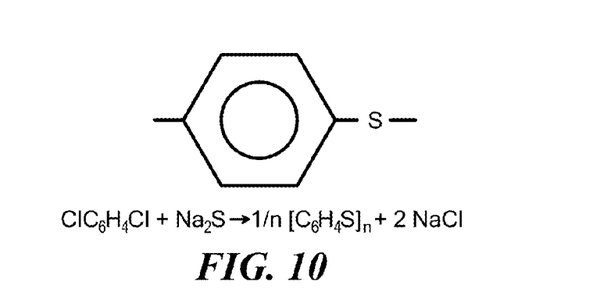
FIG. 10 exemplarily shows a resulting formula for the crystalline polymer of the present invention.

The invention uses a "crystalline or semi-crystalline polymer", exemplarily illustrated in FIG. 9, which typically is above a crystallinity value of 30%, and has a glass transition temperature above 200° C., and a melting temperature above 250° C. Added to this are compounds containing appropriate ions which are in stable form which can be modified after creation of the film. FIG. 10 shows the molecular structure of the crystalline polymer. The molecular weight of the monomeric unit of the polymer is 108.16 g/mol.

Typical compounds for ion sources include, but are not limited to, $Li_2O$, $LiOH$, and $ZnO$. Other examples are $TiO_2$, $Al_2O_3$, and the like. Additionally other additives may be included to further enhance conductivity or current density, such as carbon nanotubes or the like. After the film is created, a doping procedure can be used, using an electron acceptor. Alternatively the dopant can be "pre-mixed" with the initial ingredients and extruded without post processing. The purpose of the electron acceptor is two-fold: release ions for transport mobility, and to create polar high density sites within the polymer to allow for ionic conductivity. Note: there is a clear distinction between electrical conductivity and ionic conductivity.

Figure 11:
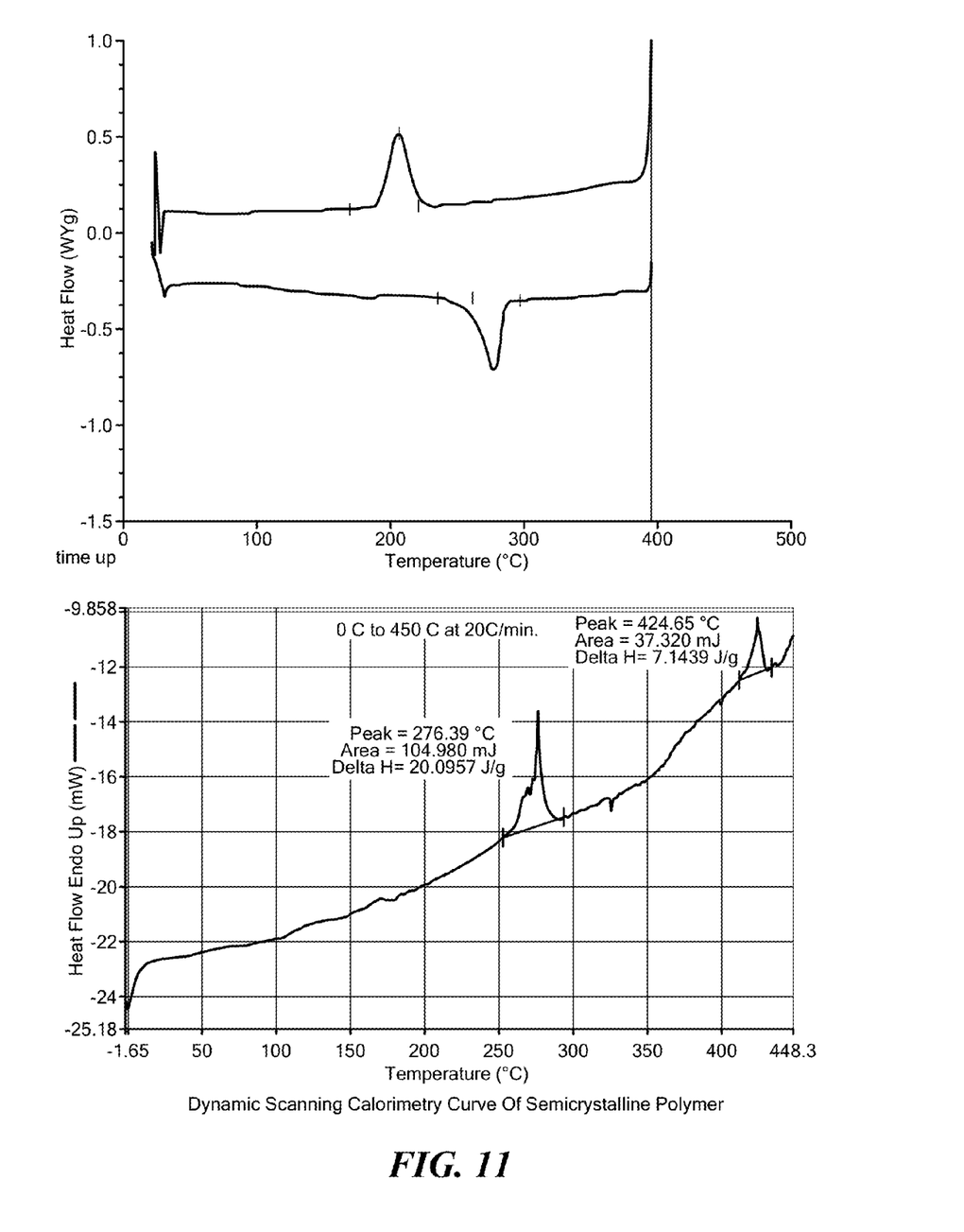
FIG. 11 exemplarily illustrates a dynamic scanning calorimeter curve of a semicrystalline polymer.
Figure 12:
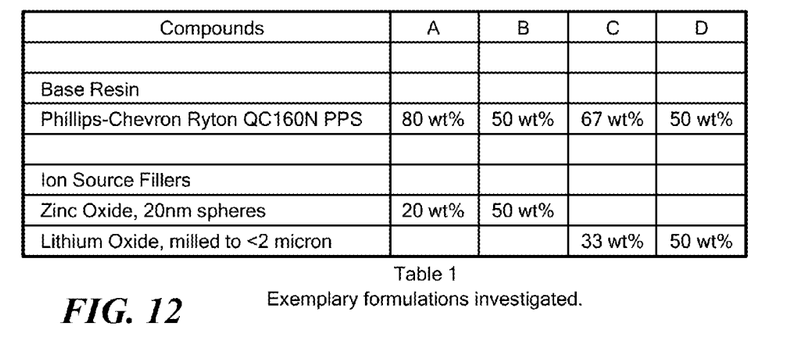
FIG. 12 exemplarily illustrates formulations which were investigated for use with the invention.

Typical materials that can be used for the polymer include liquid crystal polymers and polyphenylene sulfide (PPS), or any semicrystalline polymer with a crystallinity index greater than 30%, or other typical oxygen acceptors. FIG. 11 exemplarily illustrates a dynamic scanning calorimeter curve of a semicrystalline polymer. Table 1 of FIG. 12 illustrates exemplary formulations which were investigated.

Figure 13:
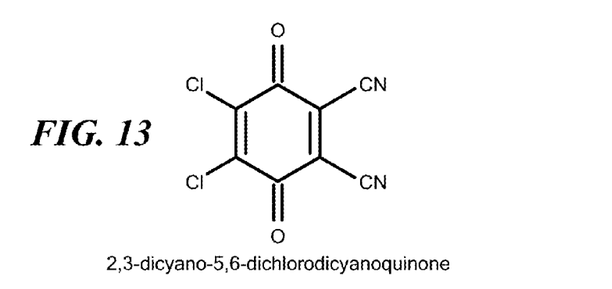
FIG. 13 exemplarily illustrates a chemical diagram of 2,3-dicyano-5,6-dichlorodicyanoquinone (DDQ).

Electron acceptors can be supplied in a vapor doping process. They can also be pre-mixed with the other ingredients. Typical electron acceptors suitable for use include, but are not limited to: 2,3-dicyano-5,6-dichlorodicyanoquinone (DDQ) ($C_8Cl_2N_2O_2$) as exemplarily illustrated in FIG. 13, Tetracyanoethylene (TCNE) ($C_6N_4$), and sulfur trioxide ($SO_3$). A preferred dopant is DDQ, and doping is preferably performed in the presence of heat and vacuum.

Figure 14:
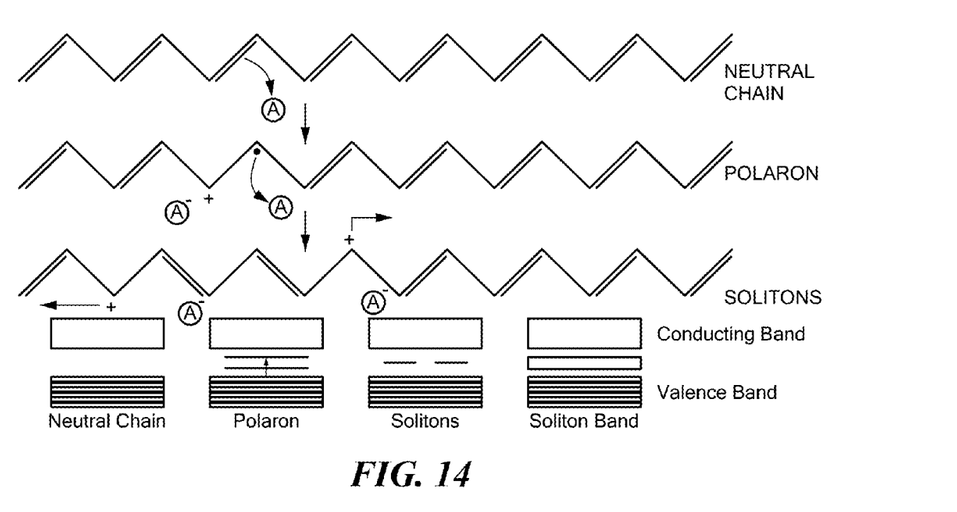
FIG. 14 exemplarily illustrates possible mechanisms of conduction of the solid electrolyte polymer according to the invention.

FIG. 14 shows possible mechanisms of conduction of the solid electrolyte polymer according to the invention. Charge carrier complexes are set up in the polymer as a result of the doping process.

Figure 15:
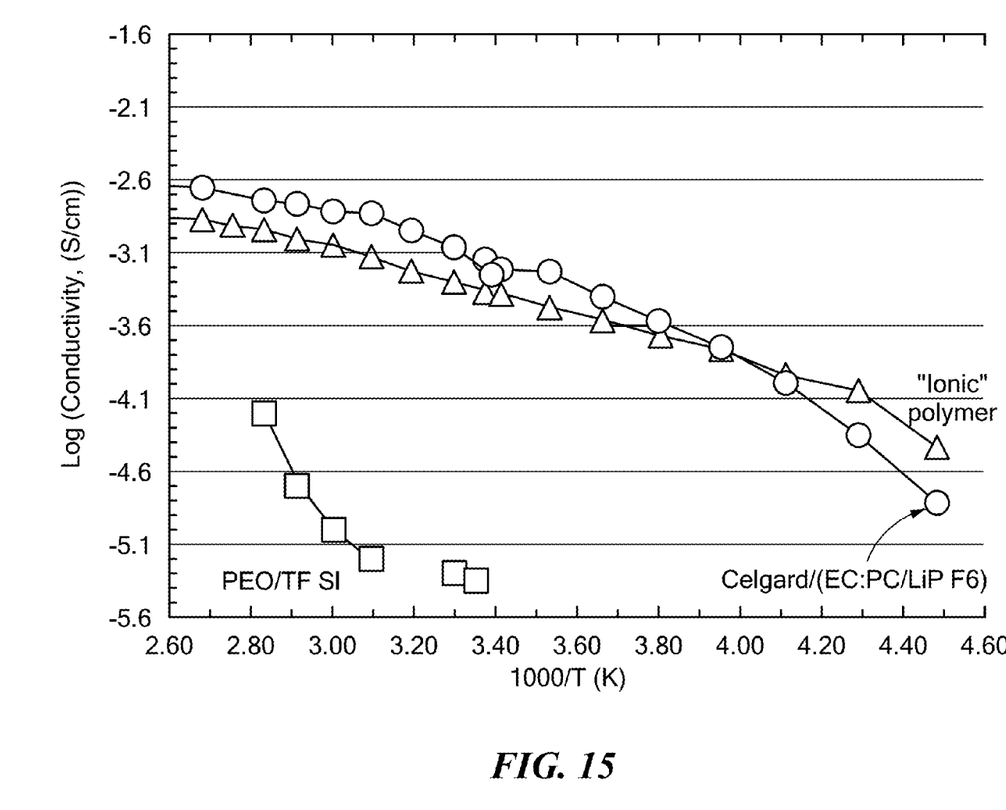
FIG. 15 exemplarily illustrates a plot of the conductivity of the ionically conductive polymer according to the invention in comparison with a liquid electrolyte and a polyethylene oxide lithium salt compound.

Extruded films have been made in thickness ranges from 0.0003" thick to 0.005". Surface conductivity measurements have been made, and the results are reported in FIG. 15. In FIG. 15, the conductivity of ionically conductive polymer according to the invention (Δ) is compared with that of trifluoromethane sulfonate PEO (□) and the liquid electrolyte Celgard/(EC:PC/LiP F6)(○). The conductivity of the ionic polymer according to the invention tracks the conductivity of the liquid electrolyte and far surpasses that of trifluoromethane sulfonate PEO at the lower temperatures.

Figure 16:
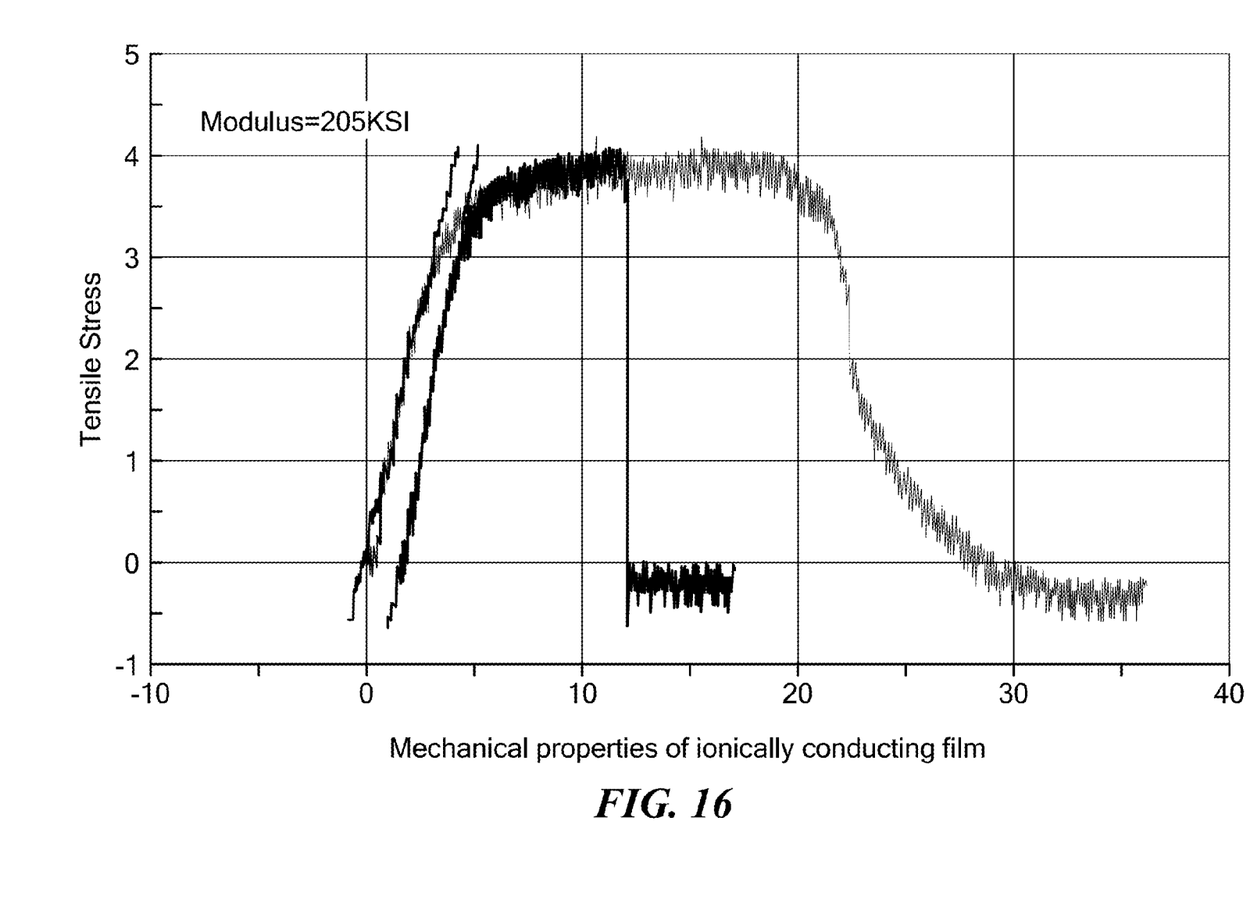
FIG. 16 exemplarily illustrates the mechanical properties of the ionically conducting film according to the invention.

FIG. 16 shows the mechanical properties of the ionically conductive film of the invention which were evaluated using ISPM IPC-TM-650 Test Methods Manual2.4.18.3. In the tensile strength versus elongation curve of FIG. 16, the "ductile failure" mode indicates that the material can be very robust.

Figure 17:
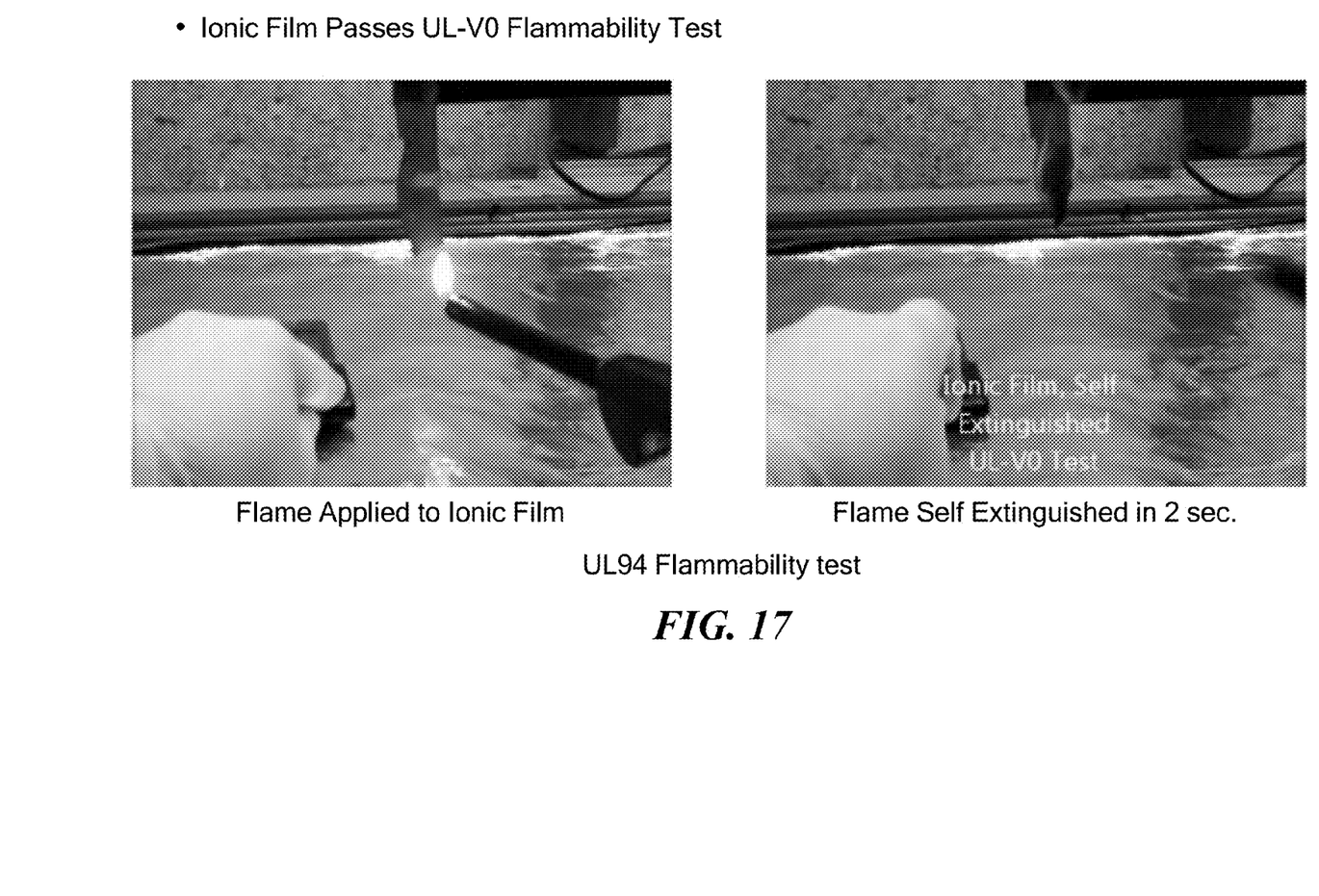
FIG. 17 exemplarily shows a UL94 flammability test conducted on a polymer according to the invention.

Flammability of the polymer was tested using a UL94 flame test. For a polymer to be rated UL94-V0, it must "self-extinguish" within 10 seconds and 'not drip". The electrolyte was tested for this property and it was determined that it self-extinguished with 2 seconds, did not drip, and therefore easily passed the V-0 rating. FIG. 17 shows pictures of the result.

Figure 18:
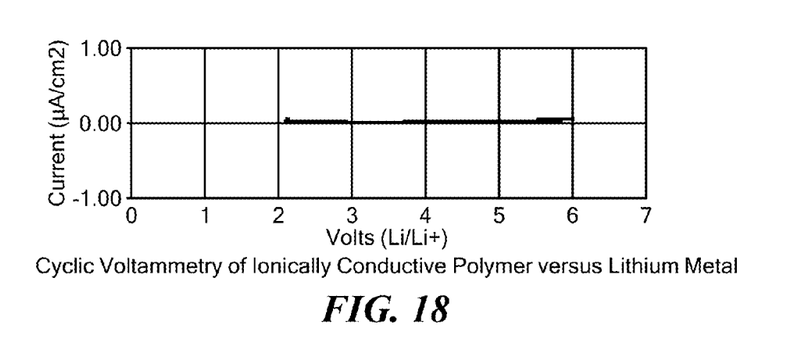
FIG. 18 exemplarily shows a plot of volts versus current of an ionically conductive polymer according to the invention versus lithium metal.

In addition to the properties of ionic conductivity, flame resistance, high temperature behavior, and good mechanical properties, it's necessary that the polymer material not be subject to chemical reaction or attack by lithium metal or other active species of the electrode materials. The traditional test for attack by polymers by lithium is done by the use of cyclic voltammetry. This is a test where the polymer is sandwiched between a lithium metal anode and blocking stainless steel electrode. A voltage is applied and it is swept from a low value (~2 volts) up to a high value greater than 4 volts. The current output is measured to determine if there is any significant reaction happening with the polymer/lithium metal. High output currents would indicate a chemical reaction which is not desirable. FIG. 18 shows the result of this study and indicates that this ionically conductive polymer is stable to at least 6 volts. The results showed good high voltage stability.

The solid polymer electrolyte according to the invention is able to achieve the following properties: A) high ionic conductivity at room temperature and through a wide temperature range (at least −10° C. to +60° C.); B) non-flammability; C) extrudability into thin films allowing for reel-reel processing and a new way of manufacturing; D) compatibility with Lithium metal and other active materials, this invention will allow for the fabrication of a true solid state battery. The invention allows for a new generation of batteries having the following properties:

No safety issues;
New form factors;
Large increases in energy density; and
large improvements in cost of energy storage.

Figure 19:
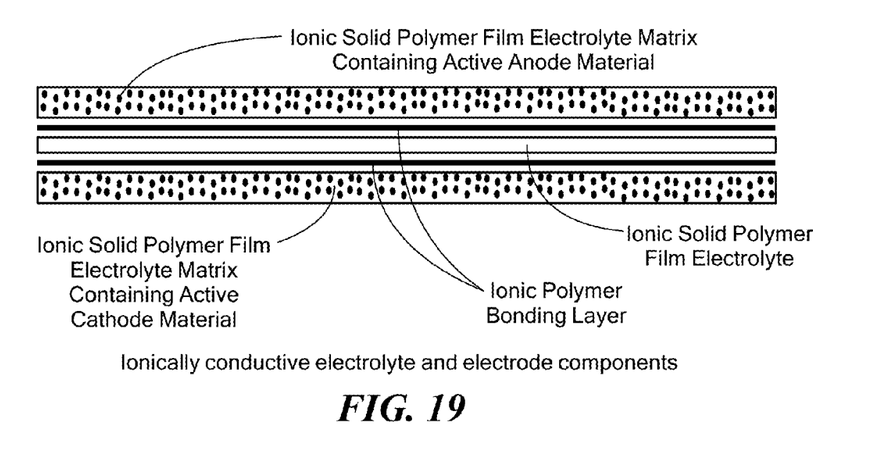
FIG. 19 exemplarily illustrates a schematic of extruded ionically conductive electrolyte and electrode components according to the invention.
Figure 20:
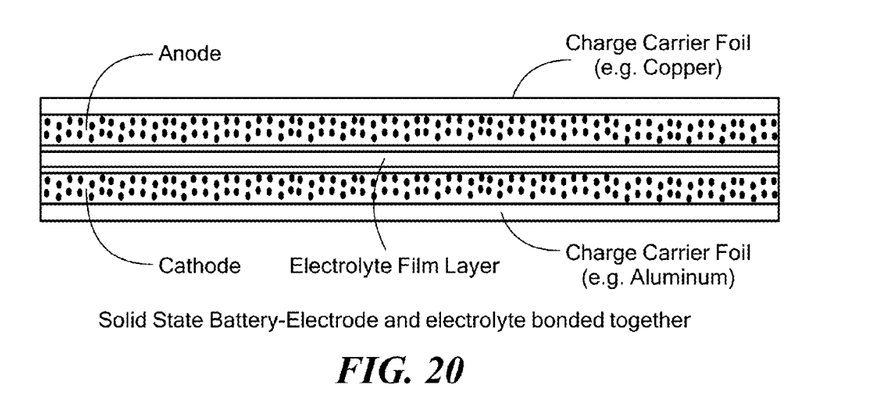
FIG. 20 exemplarily illustrates the solid state battery according to the invention where electrode and electrolyte are bonded together.
Figure 21:
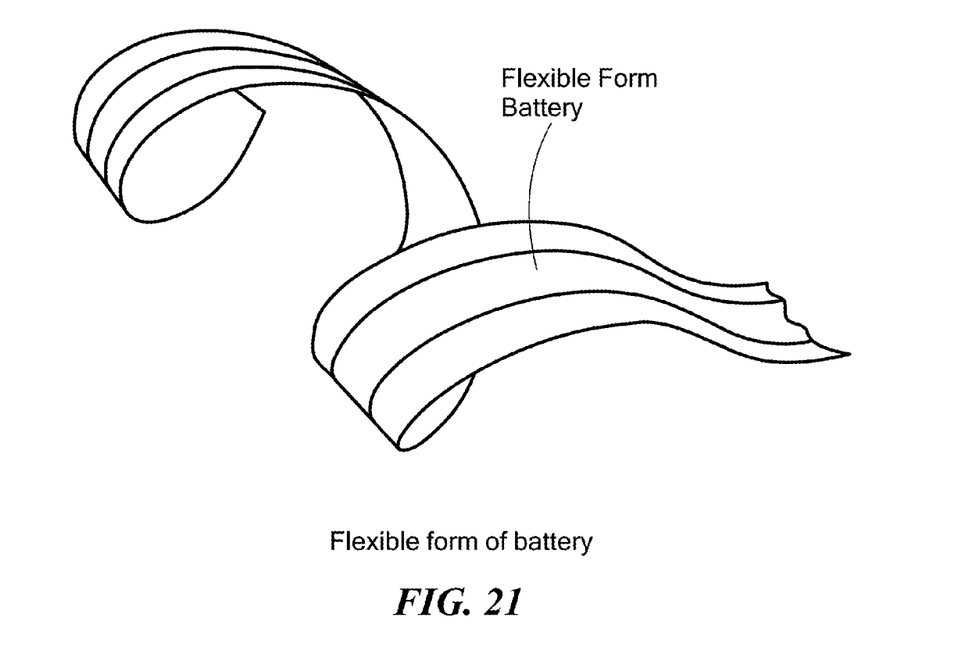
FIG. 21 exemplarily illustrates a final solid state battery according to the invention having a new and flexible form.

FIGS. 19, 20 and 21 show several elements of the solid state battery which are, respectively: A) extruded electrolyte; B) extruded anodes and cathodes; and C) final solid state battery allowing for new form factors and flexibility.

While the present invention has been described in conjunction with preferred embodiments, one of ordinary skill, after reading the foregoing specification, will be able to effect various changes, substitutions of equivalents, and other alterations to that set forth herein. It is therefore intended that the protection granted by Letters Patent hereon be limited only by the definitions contained in the appended claims and equivalents thereof.

What is claimed is:

1. A solid, ionically conducting material having an ionic conductivity greater than $1 \times 10^{-4}$ S/cm at room temperature and formed from a polymer, an electron acceptor, and at least one compound comprising an ion source, wherein the polymer is polyphenylene sulfide and, and the compound is LiOH.

2. The material of claim 1, wherein the electron acceptor is 2,3-dichloro-5,6-dicyano-1,4-benzoquinone.

* * * * *